United States Patent [19]

Monk et al.

[11] 4,289,444
[45] Sep. 15, 1981

[54] FLUID ENERGY CONVERTOR

[76] Inventors: Robert J. Monk, 1302 Green Brook Dr., De Soto, Tex. 75115; Franz W. Loesche, 4761 Broadway, House 2-6E, New York, N.Y. 10034

[21] Appl. No.: 16,725

[22] Filed: Mar. 1, 1979

[51] Int. Cl.³ ............................................. F03D 7/06
[52] U.S. Cl. ...................................... 415/3; 415/164
[58] Field of Search ....................................... 415/2–4, 415/164, 2 R, 3 R, 4 R, 208

[56] References Cited

U.S. PATENT DOCUMENTS

| | | | |
|---|---|---|---|
| 285,948 | 10/1883 | Badger | 415/4 R |
| 353,363 | 11/1886 | Ludwig | 415/4 R |
| 772,786 | 10/1904 | Clifford | 415/2 R |
| 1,248,305 | 11/1917 | Gallagher | 415/2 R |
| 1,460,114 | 6/1923 | Shelton | 415/4 R |
| 1,574,171 | 2/1926 | Ryan | 415/2 R |
| 1,640,269 | 8/1927 | Ellison | 415/2 R |
| 2,059,356 | 11/1936 | James | 415/2 R |
| 3,994,621 | 11/1976 | Bogie | 415/2 R |
| 4,134,707 | 1/1979 | Ewers | 415/4 R |
| 4,134,708 | 1/1979 | Brauser et al. | 415/2 R |

FOREIGN PATENT DOCUMENTS

| | | | |
|---|---|---|---|
| 22663 | 8/1921 | France | 415/3 |
| 544158 | 9/1922 | France | 415/3 |
| 576980 | 8/1924 | France | 415/2 R |
| 846661 | 9/1939 | France | 415/4 |
| 373773 | 6/1932 | United Kingdom | 415/4 |

Primary Examiner—Everette A. Powell, Jr.

[57] ABSTRACT

A fluid energy convertor comprising a turbine having a cylindrically shaped interior whose exterior surface is exposed to a fluid front which is naturally accelerated while flowing around same creating a current of fluid which is contained only within a portion of a cylindrically shaped passageway, located around the outside of said cylindrically shaped interior, where contact is made between said current of fluid and a series of turbine vanes causing their movement and providing an active force on same which is transmitted by way of the turbine's structure to a centrally rotating spindle and other means for providing useful work. Multiple automatically controlled adjustable louvers assist in directing the fluid front into said passageway and in containing said current of fluid within said passageway with said louvers being adjustable to either speed-up or throttle said current of fluid as required for maximum work within limits dictated by the fluid velocity, turbine size and convertor structural strength. A force induction shroud downstream from said louvers contains said current of fluid within smallest area of said passageway during a time for obtaining maximum active work forces. A protective shroud prevents contact of said fluid front with vanes moving in a direction opposite to said front for reducing drag forces. Pivotal center of said louvers, said force induction shroud and said protective shroud are fixed relative to one another and all as a unit may be fixed relative to a fixed fluid front direction or automatically maintained in a same relative position with respect to any fluid front direction which varies.

14 Claims, 12 Drawing Figures

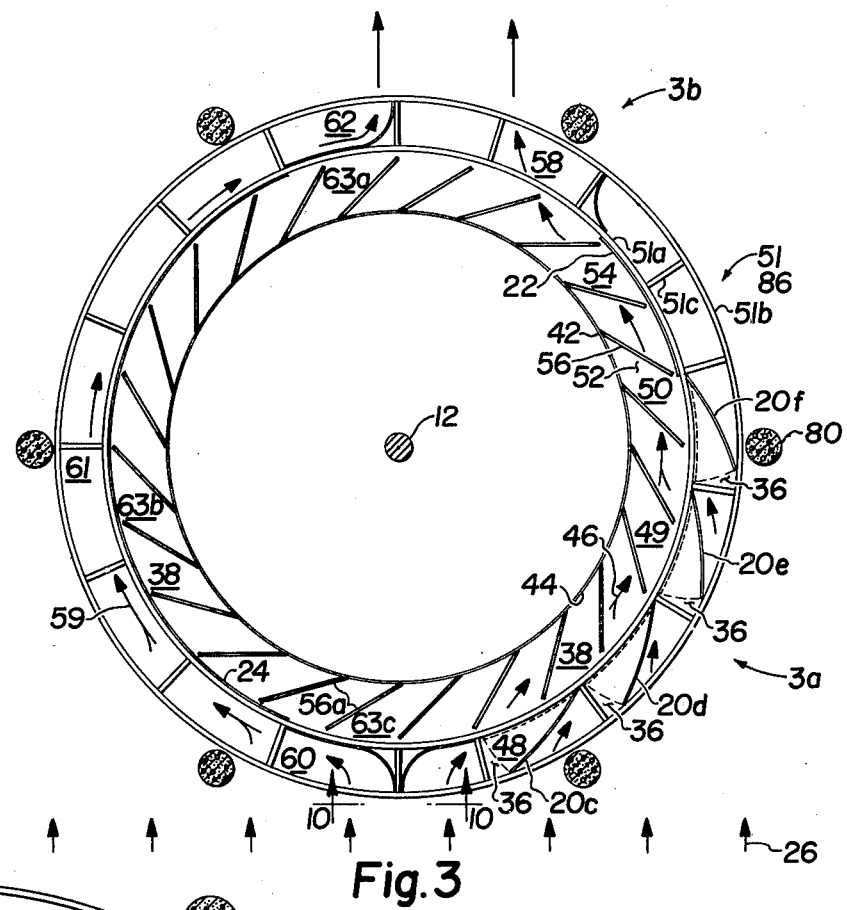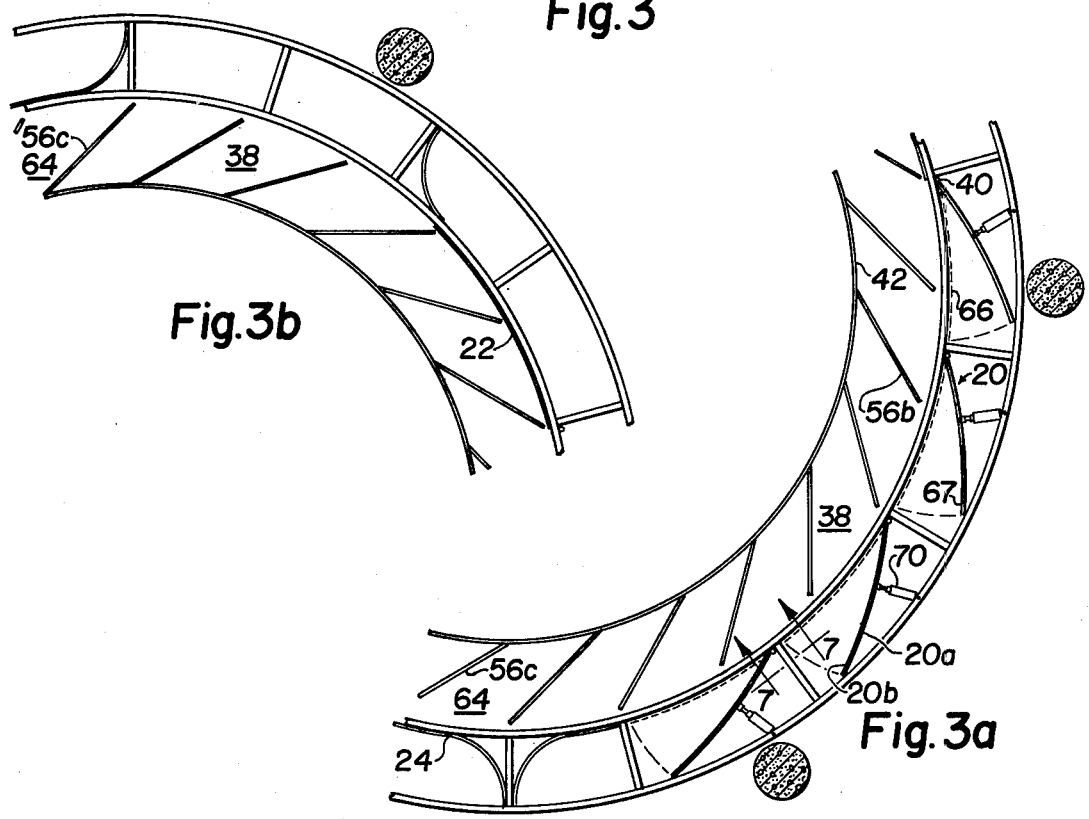
Fig.3
Fig.3b
Fig.3a

FLUID ENERGY CONVERTOR

CROSS-REFERENCE TO RELATED APPLICATIONS

Disclosure Document Program under subject: Wind Turbine; Disclosure Specification and Drawings. Assigned number 068116 on Feb. 1, 1978 by the Patent and Trademark Office.

BACKGROUND

Because of shortages of fossil fuels and the hazards of nuclear fuels, fluid energy has become a desirable source of fuel. However, problems facing the conversion of fluid energy to useful work involve not only costs but also a means of utilizing fluid traveling at lower velocities prevalent over many areas on earth. Two basic types of fluid energy convertors exist, the propeller type which operates by action of the fluid on oblique blades which radiate from a power shaft whose center parallels the fluid flow direction and the turbine type which operates by action of a current of fluid on a series of curved vanes fixed on a central rotating power spindle whose center is generally perpendicular to and offset from said current of fluid. Heretofore, propeller type convertors have been utilized supported by massive structures resulting in large capitol investments to realize the fluids potential energy. Additionally, the force component acting on the blades of propeller type convertors in a direction parallel to the axis of rotation is not utilized.

Heretofore there have been some turbine type convertors which have been designed such that vanes do not utilize the full force of the current of fluid since said fluid flow is not contained within a fixed passageway but instead is allowed to be deflected away from the path of said vanes before a maximum force is derived therefrom. In addition these convertors do not provide a means to reduce drag forces to a minimum and to fully control the velocity of said current of fluid within said passageway for assuring that maximum work is obtained within limits dictated by the fluid velocity, turbine size and structural strength of the convertor.

SUMMARY OF THE INVENTION

We have devised a fluid energy convertor comprising a turbine having a cylindrically shaped interior which has a large diameter compared to the width of a cylindrically shaped passageway which surrounds said interior. The naturally accelerated movement of a fluid front which flows around the exterior surface of a portion of said cylindrically shaped interior creates a current of fluid which is contained only within said passageway. Said current of fluid contacts a series of turbine vanes rotating within said passageway causing their movement and providing an active force on same which is transmitted by way of the turbine's structure to a centrally rotating spindle and other means for performing useful work. Said vanes being shaped for maximum contact resistance to said current of fluid when directions of movement are concurrent and for minimum drag when directions of movement are opposed. Multiple automatically controlled adjustable louvers assist in directing the fluid front into said passageway and in containing said current of fluid within said passageway with said louvers being adjustable to either speed-up or throttle said current of fluid as required for maximum work within limits dictated by the fluid velocity, turbine size and convertor structural strength. A force induction shroud downstream from said louvers contains said current of fluid within smallest area of said passageway during a time period for providing maximum active work forces. A protective shroud prevents contact of said fluid front with vanes moving in a direction opposite to said front for reducing drag forces. Pivotal center of said louvers, said force induction shroud and said protective shroud are fixed relative to one another and all as a unit may be fixed relative to a fixed fluid front direction or automatically maintained in a same relative position with respect to any fluid front direction which varies. An opening between the downstream end of said shrouds provides an exhaust opening for said current of fluid.

Natural accelerated movement of a fluid front which is flowing around the exterior of a cylindrical shape, passageway designed to contain a current of fluid which is generated from said fluid front, series of specially designed turbine vanes rotating within said passageway due to force exerted by said current of fluid, louvers for automatic velocity control of said current of fluid, work induction shroud and protective shroud all contribute to the maximum utilization of the fluid potential energy.

The primary object of this invention is to provide a relatively inexpensive fluid energy convertor, which using a relatively low velocity fluid front, is capable of producing sufficient quantities of power to provide a payout and return on investment which will be favorably considered by all users of energy, considering expected increased costs of power generation utilizing fossil fuels.

Another object of this invention is to provide an energy source which can be utilized in conjunction with other energy sources whereby the combined energy sources can be utilized with adequate storage means to provide a stand-alone nondiminishing energy supply.

Other and further objects of the invention will become apparent upon referring to the detailed description hereinafter following and drawings annexed hereto.

BRIEF DESCRIPTION OF THE DRAWING

Drawings of preferred embodiments of the invention are annexed hereto so that the invention may be better and more fully understood; in which:

FIG. 3 is an enlarged cross-sectional view taken along line 3—3 of FIG. 2;

FIG. 3a is a further enlargement of a first part of FIG. 3;

FIG. 3b is a further enlargement of a second part of FIG. 3;

FIG. 7 is an enlarged cross-sectional view taken along line 7—7 of FIG. 3a;

Numerical references are used to designate like elements throughout the various figures of drawings.

DESCRIPTION OF A FIRST PREFERRED EMBODIMENT

Figure 1:
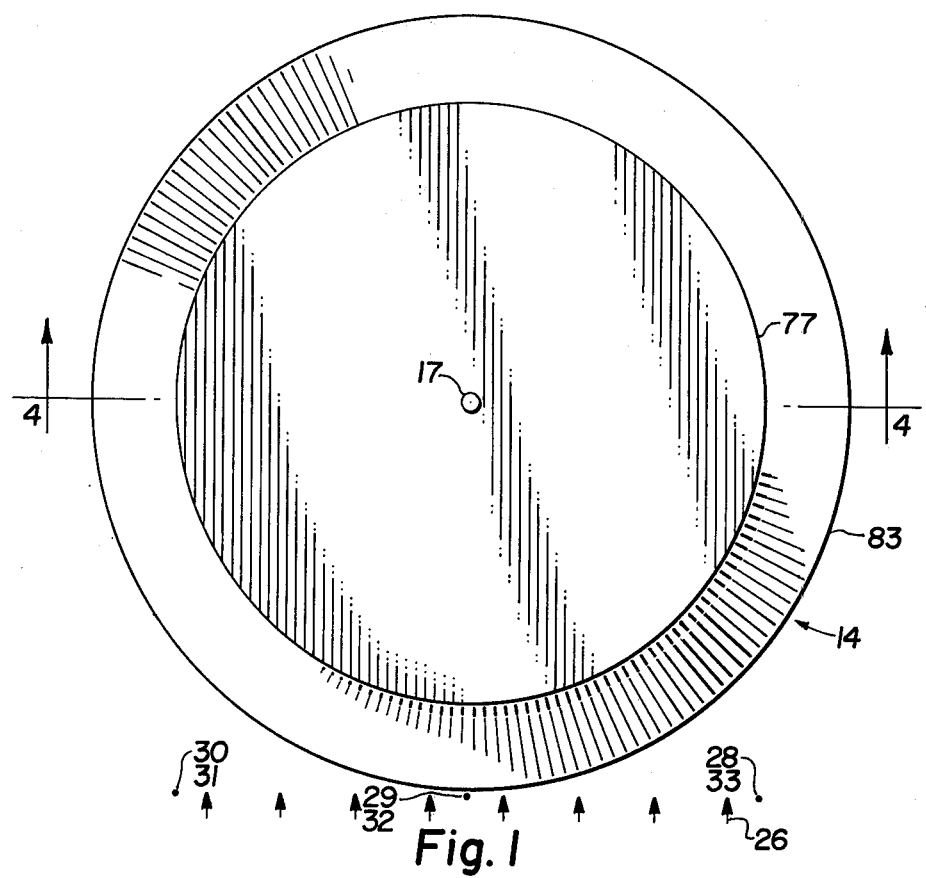
FIG. 1 is a plan view of the convertor and support structure.

Referring to FIGS. 1-4, the fluid energy convertor generally comprises a turbine generally designated 10 whose central rotating spindle 12 is rotatably secured to support structure generally designated 14 by means of bearings 16 and 17. The turbine 10 is surrounded by multiple automatically positioned adjustable louvers 20, a force induction shroud 22 and a protective shroud 24 which are all utilized for control of a fluid front 26 which has a fixed direction and which drives said turbine upon entering the convertor.

Fluid forces acting on said turbine 10 are transmitted by way of its central rotating spindle 12 and other means for performing useful work.

Figure 2:
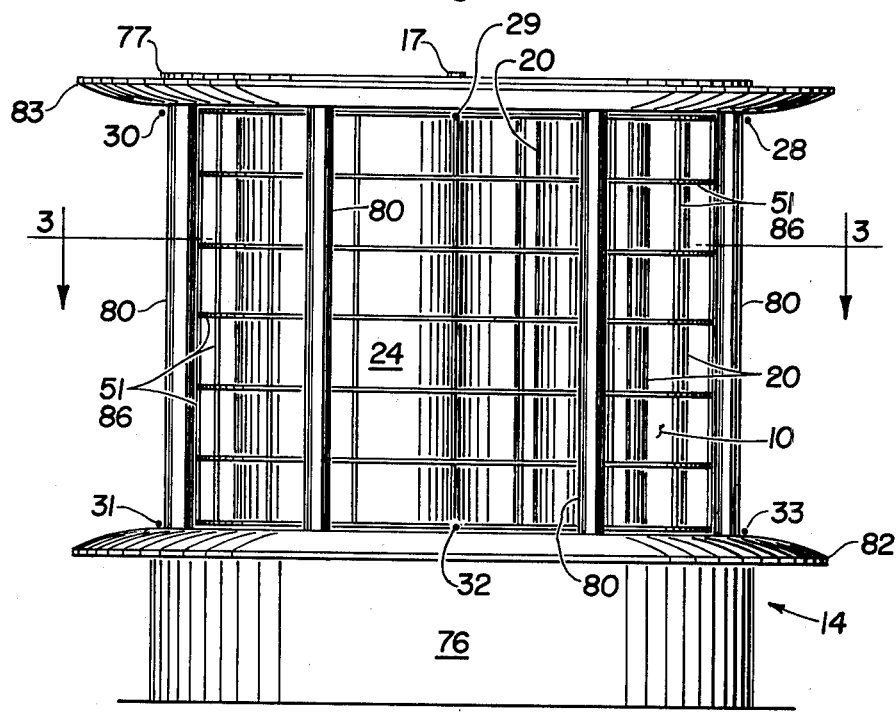
FIG. 2 is a typical elevation view.
Figures 5, 6:
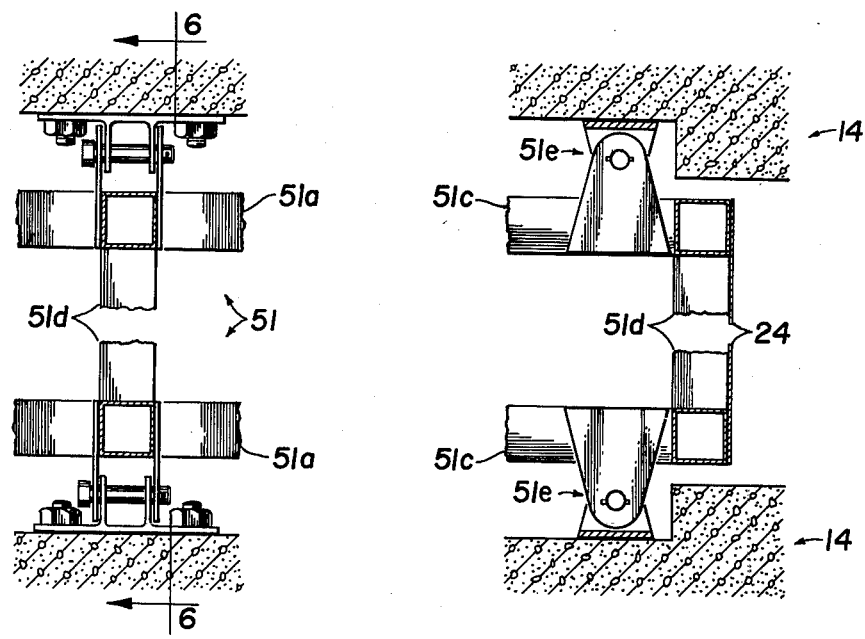
FIG. 5 is an enlarged cross-sectional view taken along line 5—5 of FIG. 4.
FIG. 6 is a cross-sectional view taken along line 6—6 of FIG. 5.

Referring to FIGS. 1-3 a fluid front 26, having a fixed direction, is shown approaching the convertor in a direction perpendicular to an imaginary area between points 28, 29, 30, 31, 32 and 33. A portion of the fluid front 26 bounded by points 28, 29, 32 and 33 enters the convertor through typical opening 36 between typical louver 20. Outside surface 20a of typical louver 20 assists in diverting the fluid front 26 into passageway 38 which is formed between typical pivotal center 40 of typical louver 20 and the cylindrically shaped interior 42 of turbine 10. As the direction of the fluid front 26 is diverted by the exterior surface 44 of the cylindrically shaped interior 42, the fluid front 26 is converted into a current of fluid 46 which increases in velocity as it travels from point 48 thru 49 to 50 and with inside surface 20b of typical louver 20 containing said current of fluid 46 within passageway 38. Typical pivotal center 40 is pivotally secured to structural assembly 51 by means of hinge 40a. Structural assembly 51 is in turn rigidly secured to support structure 14 by pad eyes 51e as indicated in FIGS. 5 and 6. Upon reaching point 50, current of fluid 46 being contained within the smallest area 52 of passageway 38 reaches its maximum velocity. While flowing between points 50 and 54, current of fluid 46 is contained within passageway 38 by force induction shroud 22; and, during the same period of time, those series of turbine vanes 56, which are also rotating within said passageway 38 along with said current of fluid 46, derive their rotational movement and active working force from the current of fluid 46. The derivation of movement and force by turbine vanes 56 from current of fluid 46 results in a deceleration of the current of fluid while it travels from point 50 to 54 where it is expelled thru exhaust opening 58. Said force induction shroud 22 is rigidly secured to structural assembly 51 which is in turn rigidly connected to support structure 14. The remainder of fluid front 26 bounded by points 29, 30, 31 and 32 is diverted from direct contact with turbine vanes 56a by protective shroud 24; and, this portion of fluid front 26 forms a second uncontrolled current of fluid 59 which flows around the outside of protective shroud 24 travelling from point 60 thru 61 to 62 where it is combined with spent current of fluid 46. Said protective shroud 24 is rigidly secured to structural assembly 51 which is in turn is rigidly connected to support structure 14.

Referring to FIGS. 3, 3a and 3b, turbine vanes 56 and 56a are designed whereby surface 56b provides maximum contact resistance to current of fluid 46 while said vanes 56 move between points 50 and 54 within passageway 38; and, with minimum clearance being maintained between said vanes 56 and force induction shroud 22, for preventing leakage of said current of fluid 46 past exterior of said vanes 56, efficiency is increased. Turbine vanes 56 and 56a are additionally designed whereby surface 56c creates minimum drag force from contact with static fluid 64 which is carried along between turbine vanes 56a as they move from point 63a thru 63b to 63c while being shielded from direct contact with fluid front 26 and second current of fluid 59 by means of protective shroud 24.

Referring to FIGS. 3 and 3a, typical automatically positioned adjustable louver 20, assists in directing the fluid front 26 into passageway 38, assists in containing said current of fluid 46 within said passageway 38 and said typical louver 20 being infinitely adjustable between typical position 66 and 67 will either speed-up or throttle said current of fluid 46 as required for maximum work within limits dictated by the fluid velocity, turbine size and convertor structural strength. Said typical louver 20 being moved between position 66 and 67 and being held in any required intermediate position by typical louver actuation means 70 which is controlled by a fluid energy utilization control. Typical louver actuation means 70 is designed for fail-safe operation whereby upon a power failure typical louver 20 will return to closed position 66 thereby stopping rotation of turbine 10. Louvers are moved from position 66 to 67 in sequence beginning with louver 20c, then continuing with louver 20d, next louver 20e and finally louver 20f when total fluid energy is utilized. For partial fluid energy utilization, the operating sequence is repeated up until the last louver to be actuated stabilizes at an intermediate position where all requirements are satisfied. A change in required fluid utilization will automatically result in a forward or reverse louver movement in sequence as required.

Figure 4:
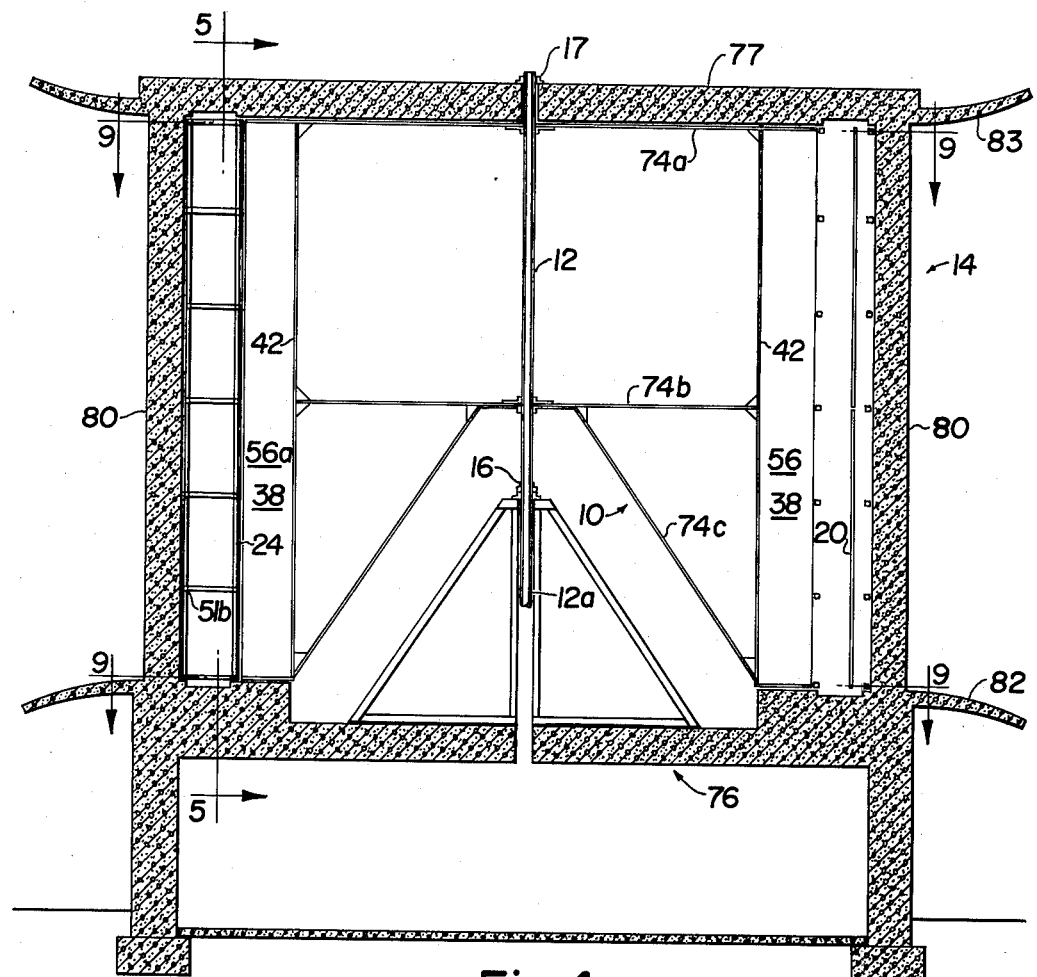
FIG. 4 is an enlarged cross-sectional view taken along line 4—4 of FIG. 1.

Referring to FIGS. 3 and 4, turbine generally designated 10 comprises vanes 56 whose interior elements form cylindrically shaped interior 42 and which are joined with central rotating spindle 12 by connecting means 74a, 74b and 74c. An extension 12a of central rotating spindle 12 connects with other means for providing useful work.

Referring to FIGS. 1 and 4, support structure generally designated 14 comprises support elements 76 and 77 which contain the fixed component of bearings 16 and 17. Support element 77 is held fixed relative to support element 76 by typical columns 80 having a circular cross section to minimize drag on passing fluid front 26. Extensions 82 and 83 to support elements 76 and 77 cause acceleration of fluid front 26 in areas adjacent to ends of turbine for increased efficiency.

Referring to FIGS. 3-4, structural assembly 51 comprises inner and outer circular shaped elements 51a and 51b, radial connector elements 51c which rigidly join together said elements 51a and 51b and longitudinal elements 51d which rigidly join together successive assembled pairs of elements 51a, 51b and 51c. Pad eyes 51e, as shown in FIGS. 5 and 6, provide means of connecting structural assembly 51 with support structure 14.

Fluid energy utilization control uses a first input derived from a reference instrument indicating speed of the fluid front 26 and a second input from the turbine's central rotating spindle 12 indicating its rotating speed.

Using said first input, said fluid energy utilization control automatically adds on or sheds off work load increments connected with said spindle 12 for maintaining an optimum balance between the force exerted by the fluid on the turbine vanes and the tangential velocity of the turbine vanes. The optimum balance assures that maximum work is accomplished within any particular incremental range of fluid velocities. Under high fluid flow conditions where the rotating speed of spindle 12 approaches the maximum allowable speed of the turbine, based on its structural strength, the fluid energy utilization control automatically repositions typical louver 20 in sequence until the maximum allowable speed is maintained. Under conditions where the rotating speed of the turbine is maximum, said fluid energy utilization control using said first input will have added on all available work load increments. Additionally for lower fluid velocities insufficient to accomplish even minimum useful work, said fluid energy utilization control removes all work load increments from said spindle 12.

DESCRIPTION OF A SECOND PREFERRED EMBODIMENT

Referring to FIGS. 1-4, the fluid energy convertor generally comprises a turbine generally designated 10 whose central rotating spindle 12 is rotatably secured to support structure generally designated 14 by means of bearings 16 and 17. The turbine 10 is surrounded by multiple automatically positioned adjustable louvers 20, a force induction shroud 22 and a protective shroud 24 which are all utilized for control of a fluid front 26 driving said turbine with said fluid front 26 having varying directions.

Fluid forces acting on said turbine 10 are transmitted by way of its central rotating spindle 12 and other means for performing useful work.

Figure 7:
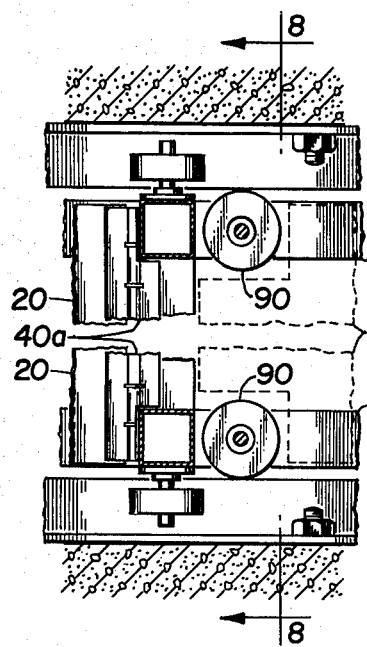
Figure 8:
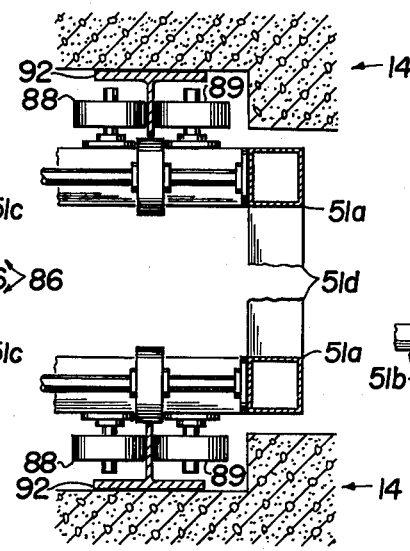
FIG. 8 is a cross-sectional view taken along line 8—8 of FIG. 7.
Figure 10:
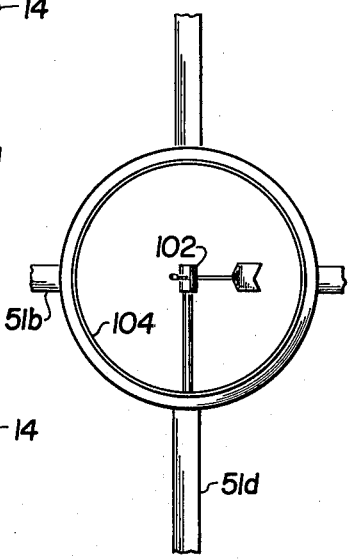
FIG. 10 is an enlarged elevation view taken along line 10—10 of FIG. 3.
Figure 9:
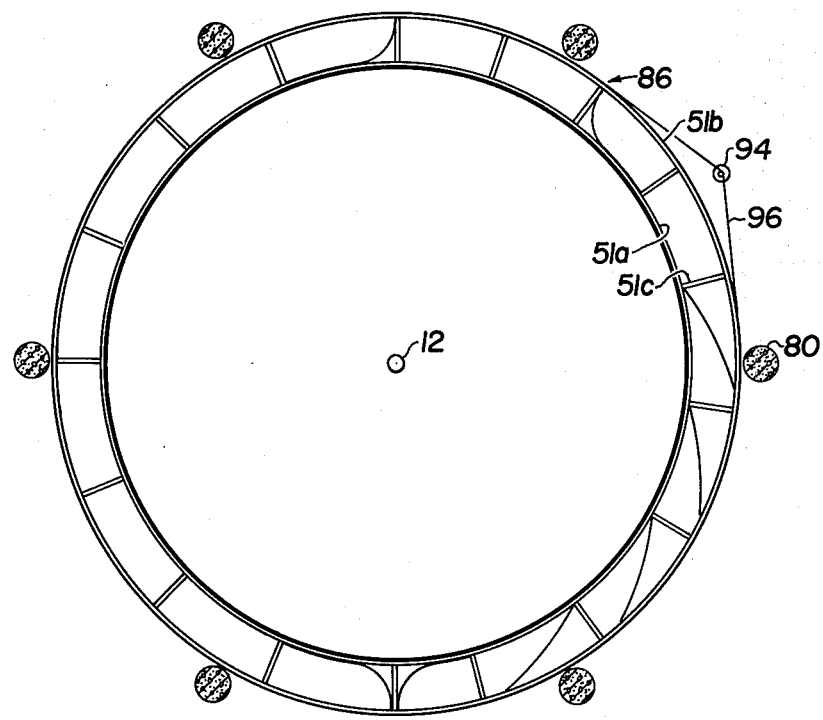
FIG. 9 is a cross-sectional view taken along line 9—9 of FIG. 4.

Referring to FIGS. 1-4, a fluid front 26 having variable directions is shown approaching the convertor in an identical manner and with the same results as indicated in the first preferred embodiment except movable structural assembly 86 is automatically rotated with respect to support structure 14 and around turbine 10 for maintaining typical pivotal center 40 of typical louver 20, force induction shroud 22 and protective shroud 24 in a same relative position with respect to the varying direction of fluid front 26. Referring to FIGS. 7 and 8, typical pivotal center 40 is pivotally secured to movable structural assembly 86 by means of hinge 40a; and, force induction shroud 22 and protective shroud 24 are rigidly secured to movable structural assembly 86 by suitable fastening means. Referring to FIGS. 7 and 8, ends of movable structural assembly 86 are restrained for only rotational movement around said turbine 10 by means of typical rollers 88, 89 and 90 contacting a guide 92 which is rigidly secured to support structure 14. Movable structural assembly 86 is otherwise identical to structural assembly 51 described in the First Preferred Embodiment except pad eyes 51e are omitted. Referring to FIG. 9, typical prime mover 94 rigidly secured to support structure 14 and being drivingly connected with movable structural assembly 86 by driving means 96 causes rotation of said movable structural assembly 86 in response to a fluid front direction finder control. Input to said finder control originates at direction indicator means 102 mounted inside cowling 104 located within leading edge of movable structural assembly 86 as shown in FIG. 10.

Turbine vanes 56, typical automatically positioned adjustable louver 20, turbine generally designated 10 and support structure generally designated 14 are identical to those described in the First Preferred Embodiment.

Fluid energy utilization control is identical to that described in the First Preferred Embodiment with the additional function of stopping all action by fluid front direction finder control in positioning movable structural assembly 86 when lower fluid velocities are insufficient to accomplish even a minimum of useful work.

Fluid front direction finder control uses one of two input signals or the lack of either said signal originating from direction indicator means 102 in controlling rotational positioning of movable structural assembly 86 by clockwise directional actuation, counter clockwise directional actuation or nonactuation of typical prime mover 94. To prevent unnecessary oscillating movement of said typical prime mover 94, switches, which are actuated by means connected with said direction indicator means 102 for originating said input signals, are separated apart from the mean centered direction of said means such that equal oscillations of said direction indicator means 102 to either side of a centered direction do not cause said signals to be generated. Said separation being adjustable to correspond to any locally determined condition. Said fluid front direction finder is rendered inoperative by said fluid energy utilization control during times when lower fluid velocities are insufficient to accomplish even a minimum of useful work for preventing said fluid front direction finder from endless hunting. Said direction indicator means 102 is additionally equipped with a means to force it off center direction when there is little or no fluid flow; whereby, when the fluid flow again begins to increase from a direction undetectable by said vane 102 said offset vane will allow said fluid front direction finder to again function for locating said changed fluid front direction.

Having described our invention, we claim:

1. A fluid energy convertor which produces from linear moving fluid a rotating torque used to perform useful work, comprising:

a support structure constructed to allow unrestricted entrance and exit of said fluid into and out of same;

a turbine rotatably supported by and positioned within said support structure whereupon being contacted by said moving fluid power is produced for performing useful work;

a structural assembly rigidly secured to said support structure and maintained at close clearance with said turbine when said fluid is unidirectional whereby support is provided for louvers and shrouds at fixed relative positions to the direction of said moving fluid for controlling said moving fluid which enters into said support structure;

multiple adjustable louvers pivotally supported by said structural assembly at locations where it is possible to divert maximum moving fluid quantities into said support structure and with said louvers being maintained at close clearance to said turbine and being automatically held at required open positions or required closed position by actuation means communicating with said louvers and said structural assembly whereby a controlled quantity of said fluid is diverted into said turbine;

a force induction shroud rigidly secured to said support structure at a location where maximum fluid velocity is available and where said moving fluid will travel a finite distance while in contact with said turbine and with said shroud being maintained at close clearance with said turbine whereby over said finite distance with said shroud and said turbine remained parallel and at close clearance said moving fluid will experience a velocity decrease as power from said moving fluid in the form of force and motion is imparted to said turbine;

a protective shroud rigidly secured to said support structure at a location adjacent to outside turbine surfaces moving in a relative direction opposite from said moving fluid direction and maintained with clearance from said turbine whereby drag force is reduced on said turbine by diverting the moving fluid around the outside of said shroud.

2. The combination called for in claim 1 wherein said turbine comprises:

a central rotating spindle rotatably supported by said support structure whereby through said spindle a rotating torque is connected to a load for performing useful work;

a cylindrically shaped interior rigidly secured to said spindle whereby the moving fluid velocity is increased as it is diverted around the exterior surface of same; and multiple vanes rigidly secured and joined fluid tight to said interior whereby the first surface of said vanes being contacted by said moving fluid absorbs a portion of the velocity energy of said moving fluid whereupon said velocity energy is transformed into force acting on said vanes and into rotational movement of said vanes, said force and rotational movement being the same as said rotating torque or power are maintained at optimal values for maximum power generation by adjustable control of said work load by other means and whereby the second vane surface being protected from said moving fluid by said protective shroud minimizes drag force resisting said force and rotational movement when motion of said second vane surface is in a direction generally opposite from said moving fluid direction.

3. The combination called for in claim 1 wherein said adjustable louvers comprise:

an inside surface formed of rigid material rigidly joined to said pivotal edge and movably connected to said actuation means whereby in any said adjustable position said surface contacts said moving fluid which enters into said support structure for containment of a controlled quantity of said fluid in the space occupied by said turbine with said moving fluid comingling with additional moving fluid entering said support structure through other open louvers for increased fluid velocity, pivotal edge of last said louver contacted by said moving fluid adjoins with said force induction shroud where said moving fluid has a maximum velocity; and an outside surface rigidly secured to said inside surface whereby in any said adjustable position movable fluid contacting same is diverted into said turbine or whereby in said closed position said moving fluid is diverted around outside of said turbine as necessary for extremely high fluid velocities.

4. The combination called for in claim 3 wherein said force induction shroud comprises:

an inside surface formed of rigid material rigidly joined to said structural assembly and maintained at close clearance with said turbine vanes whereby said inside surface contacting said moving fluid keeps same from being deflected away from said turbine thereby maintaining an optimum velocity for force and motion transfer to said turbine from said moving fluid.

5. The combination called for in claim 1 wherein said protective shroud comprises:

an outside surface formed of rigid material rigidly joined to said structural assembly whereby said outside surface deflects said moving fluid around the parts of said turbine travelling in a relative direction opposite from direction of said moving fluid thereby preventing a drag force from acting on said turbine to oppose said maximum power transfer; and an interior surface formed of rigid material rigidly connected to said outside surface and maintained with clearance from said turbine whereby fluid carried along with said turbine also creates minimum drag force.

6. The combination called for in claim 1 wherein said rigidly secured structural assembly comprises:

various elements rigidly joined together to form a stable space frame whereby said assembly supports said louver pivotal centers and actuation means along with said force induction and protective shrouds at fixed relative positions to one another and to direction of said unidirectional moving fluid while maintaining clearance with said turbine.

7. A fluid energy convertor which produces from linear moving fluid a rotating torque used to perform useful work, comprising:

a support structure constructed to allow unrestricted entrance and exit of said fluid into and out of same;

a turbine rotatably supported by and positioned within said support structure whereupon being contacted by said moving fluid power is produced for performing useful work;

a structural assembly rotatably supported by said support structure around and at close clearance from said turbine when said fluid varies in direction whereby support is provided for louvers and shrouds at fixed relative positions to the direction of said moving fluid for controlling said moving fluid which enters into said support structure;

multiple adjustable louvers pivotally supported by said structural assembly at locations where it is possible to divert maximum moving fluid quantities into said support structure and with said louvers being maintained at close clearance to said turbine and being automatically held at required open positions or required closed position by actuation means communicating with said louvers and said structural assembly whereby a controlled quantity of said fluid is diverted into said turbine;

a force induction shroud rigidly secured to said support structure at a location where maximum fluid velocity is available and where said moving fluid will travel a finite distance while in contact with said turbine and with said shroud being maintained at close clearance with said turbine whereby over said finite distance with said shroud and said turbine remained parallel and at close clearance said moving fluid will experience a velocity decrease as power from said moving fluid in the form of force and motion are imparted to said turbine;

a protective shroud rigidly secured to said support structure at a location adjacent to outside turbine surfaces moving in a relative direction opposite from said moving fluid direction and maintained with clearance from said turbine whereby drag force is reduced on said turbine by diverting the moving fluid around and outside of said shroud.

8. The combination called for in claim 7 wherein said turbine comprises:

a central rotating spindle rotatably supported by said support structure whereby through said spindle a rotating torque is connected to a load for performing useful work;

a cylindrically shaped interior rigidly secured to said spindle whereby the moving fluid velocity is increased as it is diverted around the exterior surface of same; and multiple vanes rigidly secured and joined fluid tight to said interior whereby the first surface of said vanes being contacted by said moving fluid absorbs a portion of the velocity energy of said moving fluid whereupon said velocity energy is transformed into force acting on said vanes and into rotational movement of said vanes, said force and rotational movement being the same as said rotating torque or power are maintained at optimal values for maximum power generation by adjustable control of said work load by other means and whereby the second vane surface being protected from said moving fluid by said protective shroud minimizes drag force resisting said force and rotational movement when motion of said second vane surface is in a direction generally opposite from said moving fluid direction.

9. The combination called for in claim 7 wherein said adjustable louvers comprise:

an inside surface formed of rigid material rigidly joined to said pivotal edge and movably connected to said actuation means whereby in any said adjustable position said surface contacts said moving fluid which enters into said support structure for containment of a controlled quantity of said fluid in the space occupied by said turbine with said moving fluid commingling with additional moving fluid entering into said support structure through other open louvers for increased fluid velocity, pivotal edge of last said louver contacted by said moving fluid adjoins with said force induction shroud where said moving fluid has a maximum velocity; and an outside surface rigidly secured to said inside surface whereby in any said adjustable position movable fluid contacting same is diverted into said turbine or whereby in said closed position said moving fluid is diverted around outside of said turbine as necessary for extremely high fluid velocities.

10. The combination called for in claim 9 wherein said force induction shroud comprises:

an inside surface formed of rigid material rigidly joined to said structural assembly and maintained at close clearance with said turbine vanes whereby said inside surface contacting said moving fluid keeps same from being deflected away from said turbine thereby maintaining an optimum velocity for force and motion transfer to said turbine from said moving fluid.

11. The combination called for in claim 7 wherein said protective shroud comprises:

an outside surface formed of rigid material rigidly joined to said structural assembly whereby said outside surface deflects said moving fluid around the parts of said turbine travelling in a relative direction opposite from direction of said moving fluid thereby preventing a drag froce from acting on said turbine to oppose said maximum power transfer; and an interior surface formed of rigid material rigidly connected to said outside surface and maintained with clearance from said turbine whereby fluid carried along with said turbine also creates minimum drag force.

12. The combination called for in claim 7 wherein said rotatably movable structural assembly comprises:

various elements rigidly joined together to form a stable space frame whereby said assembly supports said louver pivotal centers and actuation means along with said force induction and protective shrouds at fixed relative positions to one another;

a supporting means whereby said structural assembly is constrained for only rotational movement around outside and with clearance from said turbine;

a connecting means drivingly connected between said movable structural assembly; and an actuation means whereby rotation of said structural assembly is provided in response to a fluid front direction finder control for maintaining said assembly at a same relative position to the direction of said variable direction moving fluid.

13. The combination called for in claim 12 wherein said fluid front direction finder control for use with an external power supply comprises:

a direction indicator means rotatably secured to said movable structural assembly at a position whereby said indicator means which aligns with the direction of said moving fluid will induce output signals when said moving fluid direction and said structural assembly position are not in required alignment, using said external power and said output signals the fluid front direction finder control maintains position of said movable structural assembly in alignment with direction of said moving fluid by controlling power supply to said actuation means drivingly connected with said movable structural assembly.

14. The combination called for in claim 12 wherein said fluid front direction finder control for use with an external power supply comprises:

a direction indicator means rotatably secured to said movable structural assembly at a position whereby said indicator means which aligns with the direction of said moving fluid will induce output signals when said moving fluid direction and said structural assembly position are not in required alignment, using said external power supply and said output signals the fluid front direction finder control maintains position of said movable structural assembly in alignment with direction of said moving fluid by controlling power supply to said actuation means drivingly connected with said movable structural assembly.

* * * * *